Figure 1:
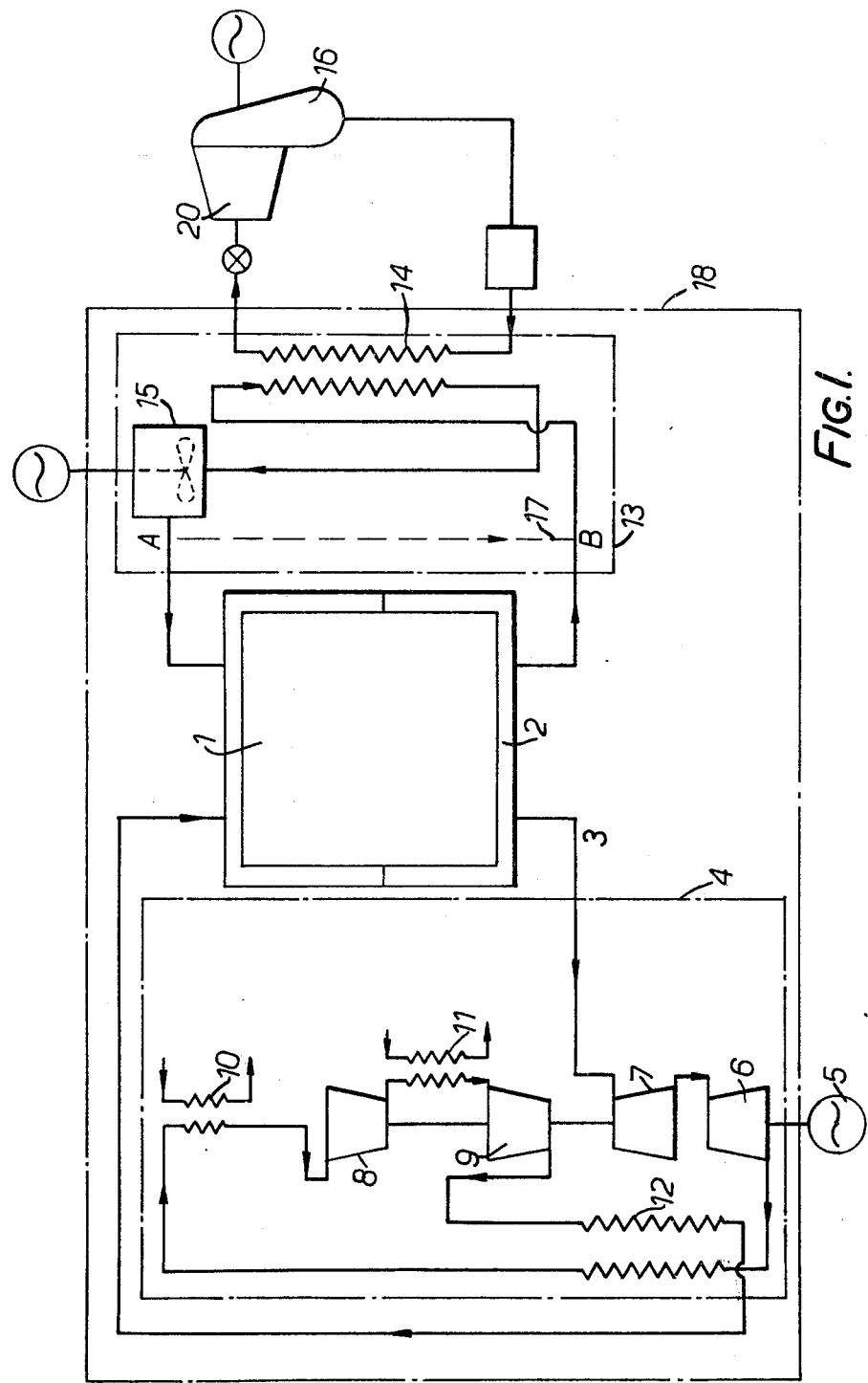

United States Patent [19]
George et al.

[11] 3,974,029
[45] Aug. 10, 1976

[54] NUCLEAR REACTORS WITH AUXILIARY BOILER CIRCUIT

[75] Inventors: Brian Victor George, Willoughby Waterleys; Reginald Kenneth Cook, Kibworth Harcourt, both of England

[73] Assignee: Nuclear Power Company (Whetstone) Limited, Leicester, England

[22] Filed: June 10, 1974

[21] Appl. No.: 477,636

[30] Foreign Application Priority Data
June 8, 1973    United Kingdom    27344/73

[52] U.S. Cl. ................................... 176/60; 176/65
[51] Int. Cl.² ........................................... G21C 15/22
[58] Field of Search ........................... 176/38, 60, 65

[56] References Cited
UNITED STATES PATENTS

| | | | |
|---|---|---|---|
| 3,103,917 | 9/1963 | Bauer et al. | 176/60 UX |
| 3,240,678 | 3/1966 | Hemmerle et al. | 176/60 X |
| 3,255,084 | 6/1966 | Doroszlai | 176/60 X |
| 3,321,377 | 5/1967 | Schluderberg | 176/60 |
| 3,322,640 | 5/1967 | Heathcote | 176/65 X |
| 3,434,924 | 3/1969 | Pouderoux | 176/65 X |
| 3,630,839 | 12/1971 | Podolsky | 176/65 X |
| 3,666,623 | 5/1972 | Harand | 176/60 |

*Primary Examiner*—Verlin R. Pendegrass
*Assistant Examiner*—Peter A. Nelson
*Attorney, Agent, or Firm*—Kirschstein, Kirschstein, Ottinger & Frank

[57] ABSTRACT

A gas-cooled nuclear reactor has a main circulatory system for the gaseous coolant incorporating one or more main energy converting units, such as gas turbines, and an auxiliary circulatory system for the gaseous coolant incorporating at least one steam generating boiler arranged to be heated by the coolant after its passage through the reactor core to provide steam for driving an auxiliary steam turbine, such an arrangement providing a simplified start-up procedure also providing emergency duties associated with long term heat removal on reactor shut down.

11 Claims, 2 Drawing Figures

NUCLEAR REACTORS WITH AUXILIARY BOILER CIRCUIT

This invention relates to gas-cooled nuclear reactors, that is to say reactors of the kind in which thermal energy is arranged to be extracted from the reactor core by the passage therethrough of a gaseous coolant, commonly helium, for subsequent transfer to one or more energy converting units. The invention is especially, though not exclusively, concerned with nuclear reactors of this kind in which the gaseous coolant is used directly as the working fluid for one or more closed cycle gas turbines providing the main power output from the reactor.

According to the invention a gas-cooled nuclear reactor has a main circulatory system for the gaseous coolant incorporating one or more main energy converting units, such as gas turbines, and an auxiliary circulatory system for the gaseous coolant incorporating at least one steam generating boiler arranged to be heated by the coolant after its passage through the reactor core to provide steam for driving an auxiliary steam turbine.

In the case of a reactor in which the main energy conversion is effected by one or more gas turbines such an arrangement enables the reactor to be started up utilising the cooling effect of the auxiliary circulatory system independently of the gas turbine cycle start-up procedure. This is an advantage because the large powers required to drive the compressors of gas turbine plant give rise to problems on starting, and special provisions have to be made to ensure that the turbine rotor attains a speed sufficient to allow the turbine drive to be self-sustaining, so that by separating the starting of the reactor and gas turbine systems the complete installation start-up procedure can be considerably simplified. In addition long term heat removal, either after a reactor trip or under normal reactor shutdown, can be considerably eased by shutting down the gas turbine and removing heat by the auxiliary circulatory system.

The steam turbine associated with the or each said auxiliary boiler is preferably arranged to run continuously in operation of the reactor and may be used to drive an auxiliary generator for providing electrical power for reactor services and ancillary equipment, any surplus power being exported.

In a typical embodiment a plurality of gas turbine units could be disposed around the reactor core, either in chambers in the thickness of a pressure vessel wall surrounding the reactor core or in the space between a primary pressure vessel accommodating the reactor core and a secondary pressure vessel which defines an enclosed space containing at least part of the wall of the primary pressure vessel in the manner described in co-pending U.S. patent application Ser. No. 222947, the associated auxiliary boilers preferably also being similarly disposed around the reactor core between the gas turbine units.

In the case of high temperature reactors especially, the temperature of the gas leaving the reactor core may be too high for satisfactory operation of the auxiliary boiler or boilers, in which case means may be provided for cooling the gas between the reactor core and the boiler or boilers; for example the arrangement may include means for mixing the gas emerging from the reactor core with gas at a suitably lower temperature.

This may be achieved, for example, by arranging for some of the gas leaving a boiler of the auxiliary circulatory system to by-pass the reactor core, and subsequently to mix with the heated gas leaving the core to effect the cooling thereof. However other sources of cooler gas may be employed, for example from points inside the gas turbine system.

For a high temperature reactor the thermal capacity of the auxiliary circulatory/steam turbine system may be about 16% to 20% of the thermal capacity of the core.

Figure 2:
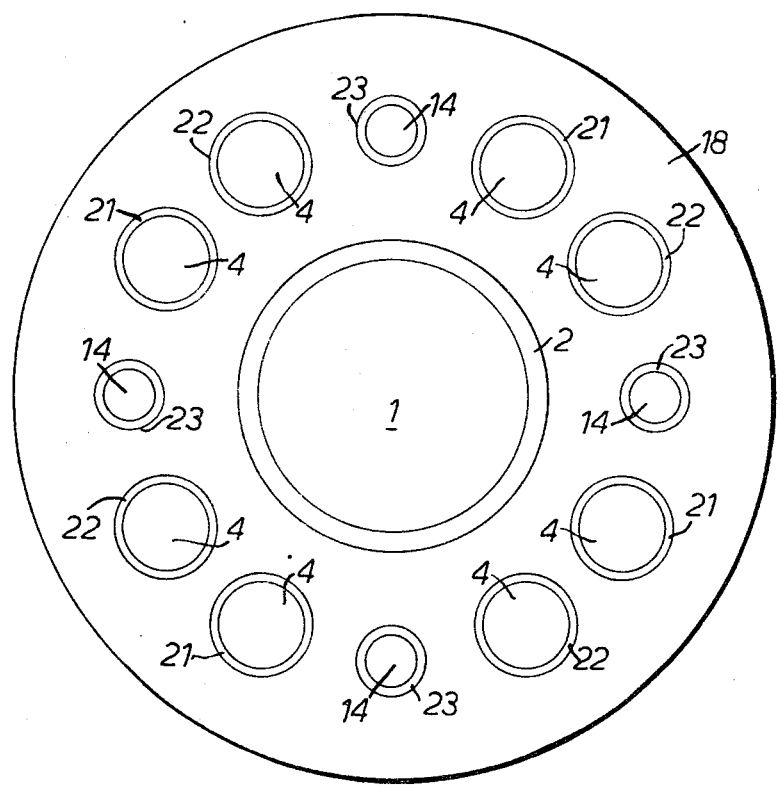

One embodiment of the invention will now be described by way of example with reference to FIGS. 1 and 2 of the accompanying schematic drawing, in which:

FIG. 1 illustrates in diagrammatic form part of a high temperature nuclear reactor in accordance with the invention, and FIG. 2 represents a schematic plan view of the reactor.

The reactor comprises a core 1 contained within a chamber 2 through which a gas such as helium is arranged to be circulated in normal use of the reactor, the gas passing around a closed circulatory system comprising a plurality of parallel loops 3, each incorporating a gas turbine, one of which is represented at 4, coupled to a main alternator 5. Each turbine unit 4 includes, in the usual way, a power turbine 6 coupled to the alternator 5, and a high pressure turbine 7 for driving low pressure and high pressure compressors 8 and 9, a precooler 10 and intercooler 11 being provided for cooling the gas passing to the low pressure and high pressure compressors respectively, and a recuperator 12 effecting an exchange of heat between the gas leaving the power turbine 6 and that fed from the high pressure compressor 9 to the reactor chamber 2.

In accordance with the invention there is also provided an auxiliary circulatory system comprising a plurality of auxiliary cooling loops, one of which is represented at 13, connected to the chamber 2 in parallel with the main circulatory system. Each of these auxiliary cooling loops incorporates a motor driven circulator 15 producing a flow of gas around the loop, and a boiler 14 in which the hot gas leaving the reactor core 1 provides the heat for generating steam for an auxiliary steam-turbine 20 driving an auxiliary generator 16. The auxiliary boiler/steam turbine system is arranged to be run continuously and provides sufficient cooling to cover reactor start-up, shut-down and emergency conditions with the main gas turbine system inoperative. Power produced by the auxiliary generator 16 can be used to supply power for reactor services and ancillary equipment.

The arrangement thus enables the reactor to be started-up separate from the gas turbine cycle start-up, and in addition long term heat removal, either after a reactor trip or under normal reactor shut-down is facilitated by shutting down the gas turbine units and removing heat from the core by the auxiliary circulatory system, as previously explained.

The temperature of the gas fed to the auxiliary boilers 14 from the reactor core 1 is preferably reduced, by mixing the gas emerging from the core with gas at a lower temperature. For this purpose each cooling loop 13 may be associated with a by-pass pipe 17 which allows some of the cooled gas leaving the respective boiler 14 to by-pass the reactor core 1 as shown. However other means of cooling the gas between the reactor core and the boilers can alternatively be provided. Thus the gas leaving the reactor core may be mixed with cooler gas from another source, for example an appropriate part of the gas turbine system.

Typically four gas turbine units and four auxiliary boilers will be associated with the reactor and these are conveniently located in chambers, commonly termed pods, in a concrete pressure vessel wall which surrounds and provides the chamber 2 for the reactor core 1.

FIG. 2 shows one such arrangement, each gas turbine unit 4, including associated compressors, recuperator and the like, being housed in an adjacent pair of chambers or pods 21, 22 formed within and spaced around a pressure vessel wall 18 which surrounds the reactor core, each auxiliary boiler 14 being located in a pod 23 separating adjacent pairs of gas turbine pods as shown.

In a modification, not illustrated, the reactor core is housed in a primary pressure vessel, surrounded by a secondary pressure vessel, the gas turbine units and auxiliary boilers being located in the space between the primary and secondary pressure vessels, for example in a manner similar to that described with reference to FIGS. 5 and 6 of co-pending U.S. patent application Ser. No. 222947.

Although the invention is particularly applicable to nuclear reactors of the kind incorporating closed cycle gas turbines, it will be appreciated that it has application to reactors in which alternative forms of energy convertors are employed. Thus the invention may be used to advantage in gas cooled reactor systems in which the major portion of the reactor heat is used for process heating.

We claim:
1. A gas-cooled nuclear reactor having
 A. a main circulatory system which includes a portion passing through the reactor core,
 B. a gaseous coolant flowing through said circulatory system,
 C. said circulatory system including at least one main energy converting unit, and
 D. an auxiliary circulatory system for the gaseous coolant,
  I. said auxiliary system including
   i. at least one steam generating boiler heatable by the gaseous coolant after its passage through the reactor core,
   ii. said boiler being heatable continuously so long as the reactor core is at an elevated temperature to generate steam continuously,
   iii. an auxiliary steam turbine,
   iv. means continuously leading steam from the steam generating boiler to the auxiliary steam turbine, and
   v. a load driven by the auxiliary steam turbine.

2. A nuclear reactor according to claim 1 having at least one closed cycle gas turbine as a main energy converting unit, and in which the gaseous coolant is used directly as the working fluid for the turbine.

3. A nuclear reactor according to claim 1 in which said auxiliary steam turbine is arranged to run continuously in operation of the reactor.

4. A nuclear reactor according to claim 3 in which the steam turbine is used to drive an auxiliary generator.

5. A nuclear reactor according to claim 2 in which a plurality of gas turbines are disposed around the reactor core, and a plurality of auxiliary boilers disposed around the reactor core between the gas turbines.

6. A nuclear reactor according to claim 5 wherein the gas turbines and the auxiliary boilers are accommodated in chambers formed within the thickness of a pressure vessel wall surrounding the reactor core.

7. A nuclear reactor according to claim 5 wherein the gas turbines and the auxiliary boilers are disposed within the space between a primary pressure vessel accommodating the reactor core and a secondary pressure vessel enclosing at least part of the wall of the primary pressure vessel.

8. A high temperature gas-cooled nuclear reactor according to claim 1 having means for cooling the gas between the reactor core and the auxiliary boiler or boilers.

9. A nuclear reactor according to claim 8 wherein the cooling means includes means for mixing the gas emerging from the reactor core with gas at a lower temperature.

10. A nuclear reactor according to claim 9 in which the or each said auxiliary circulatory system incorporates a by-pass circuit by which some of the gas leaving an associated auxiliary boiler is caused to by-pass the reactor core and mix with the heated gas leaving the core before the latter is fed back to the boiler.

11. A nuclear reactor according to claim 8, in which the thermal capacity of the auxiliary circulatory/steam turbine system is about 16% to 20% of the thermal capacity of the core.

* * * * *